Oct. 13, 1936.  A. F. KRUEGER  2,056,942
SAFETY DEVICE FOR BRAKES FOR VEHICLES
Filed June 29, 1935
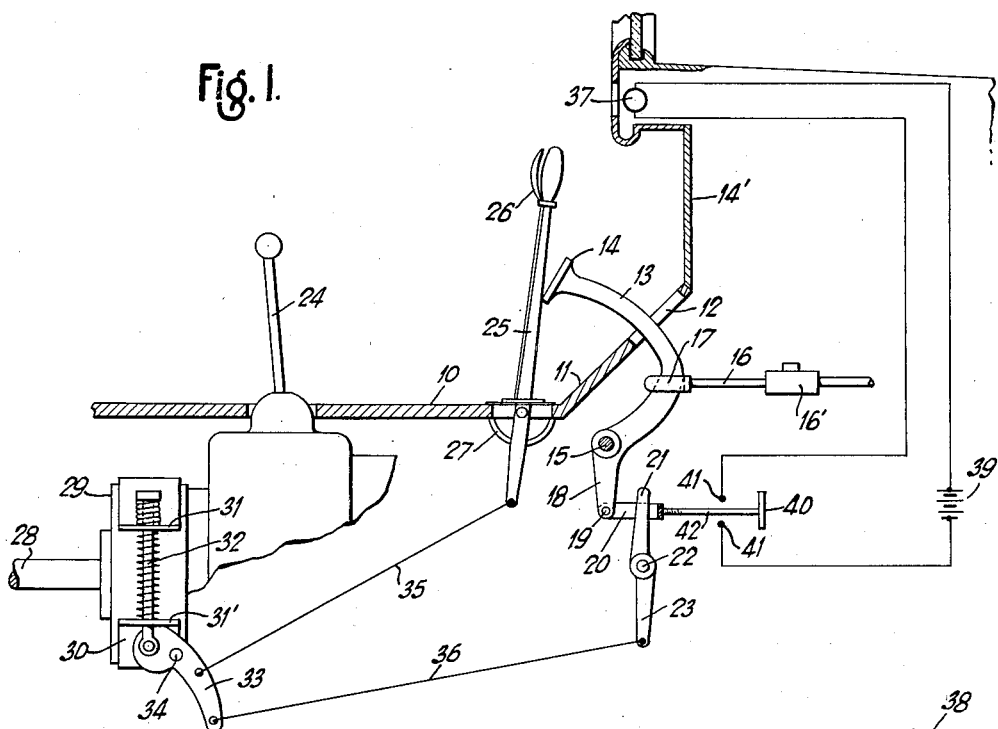
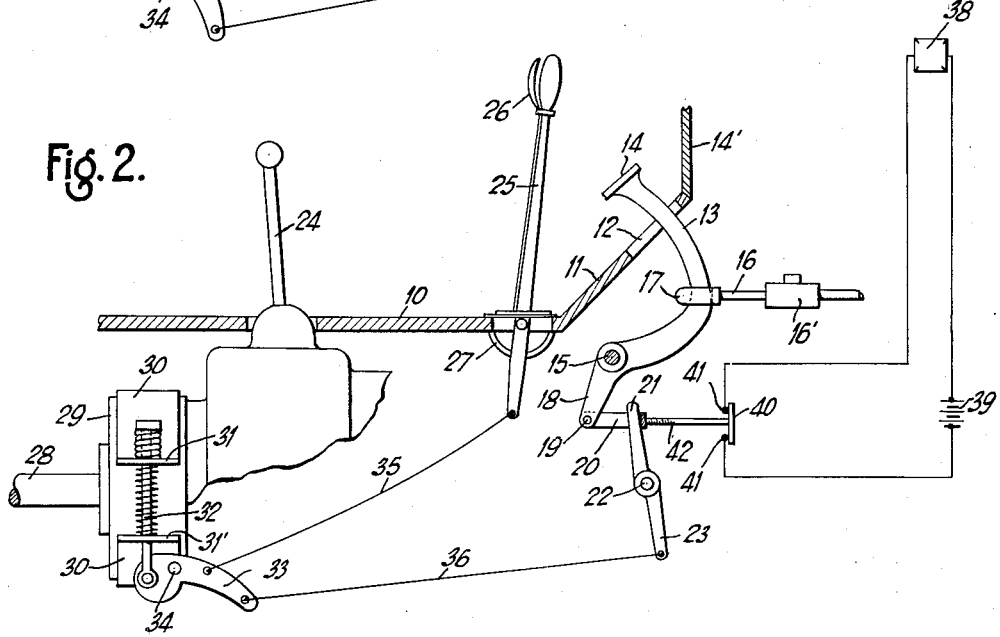
INVENTOR
AUGUST F. KRUEGER
BY
Townsend Decker
ATTORNEYS Patented Oct. 13, 1936

2,056,942

UNITED STATES PATENT OFFICE 2,056,942

SAFETY DEVICE FOR BRAKES FOR VEHICLES

August F. Krueger, Brooklyn, N. Y., assignor to The Pilgrim Laundry, Inc., Brooklyn, N. Y., a corporation of New York Application June 29, 1935, Serial No. 29,114

8 Claims. (Cl. 188—106)

This invention relates to vehicles and more particularly to automobiles employing a foot-operated pedal for actuating a service brake and a hand-operated lever for actuating an emergency brake, the manipulation of each of which effects the desired braking action to slow down or stop the vehicle at the will of the operator.

The principal object of the invention is the production of a vehicle employing brakes of the general type above specified and which shall be provided with devices or mechanism adapted to automatically throw into operation the emergency braking mechanism which is normally operated by hand lever when the braking mechanism normally operated by the foot-operated pedal or other device neglects to function properly for any reason such, for instance, as a leak in the oil transmission piping should hydraulic brakes be employed.

A further object of the invention is the production of a mechanism of the character above described in which the braking devices which are normally brought into play by the emergency hand lever may be automatically actuated without disturbance of or manipulation of the said hand lever.

Other and further objects of the invention will be apparent from the accompanying description, the invention consisting in the novel parts and combinations thereof hereinafter more particularly described and then specified in the claims.

In the accompanying drawing illustrating a practical embodiment of the invention:

Fig. 1 is a diagrammatic view of some of the conventional parts of an automobile and showing the devices of the invention in association therewith and in one position.

Fig. 2 is a similar view showing the devices of the invention in a different position and showing how the invention functions.

Referring in detail to both figures of the drawing:

The floor of an automobile is indicated at 10 and the usual inclined and removable floor foot board at 11. Said foot board meets the floor 10 and is provided with an opening 12 therein for reception of the curved shank 13 of a foot pedal 14. The usual instrument board which meets the foot board 11 is indicated at 14'. The curved shank 13 is mounted on a shaft 15 to permit rocking of the shank when the foot pedal 14 is pressed downwardly whereby a rod 16 entering cylinder 16' is pressed forwardly to operate the hydraulic or other brakes of the automobile, connection being made between the rod 16 and the shank 13 by a collar or yoke 17. So much of the apparatus just described is conventional and per se does not constitute the invention.

The shank 13 is provided with a downward extension 18 which is pivoted as at 19 to a sliding yoke 20 through which one leg 21 of a rocker arm extends, said rocker arm being mounted on a shaft 22 and being provided with a downwardly extending leg 23. This rocker arm is illustrative of the broad concept of a pull means for the hereinafter described hand brake emergency tension applicator.

The usual gear shift lever is indicated at 24 and the usual pivoted hand lever for actuating the emergency brake mechanism at 25. The locking device for holding lever 25 in any desired position is shown at 26 and it is adapted to lock with a toothed segment 27 as customarily. The driving shaft is indicated at 28 and is secured to a brake drum 29 carrying a split brake band 30, the ends of which are provided with the flanges 31 and 31' through which the spring-encircled headed bolt 32 extends, said bolt being pivoted to a cam operator such as arm 33 which in turn is pivoted, as at 34, to the lower end of the brake band 30 and adjacent to the flange 31'. The lower end of the hand lever 25 for the emergency brake mechanism is connected by a hand brake tension applicator such as flexible cable 35 to the cam arm 33 approximately centrally of the body thereof and the lower end of said cam arm is connected by an auxiliary or emergency tension applicator, such as a flexible cable 36 to the lower end of the leg 23 of the rocker arm previously described.

Normally, the parts are in the position shown in Fig. 1 and, obviously, throwing of the hand lever 25 actuates the cam 33 causing it to swing on its pivot 34 in a counter-clockwise direction whereby rod 32 will be drawn downwardly to force the ends of the brake band towards each other and thereby effect a braking action of the brake band on the brake drum 29. This may be done without causing any movement of the foot pedal 14 or of the parts adjacent thereto.

Should the operator desire to use the foot pedal 14 to actuate a hydraulic or other brake mechanism, the pedal is pressed downwardly as ordinarily, to rock with shaft 15. This in no wise affects the braking mechanism for the emergency brake 25 until the pedal has been pressed down a predetermined distance because of the lost motion connection between the rocker arm and yoke 20. If no braking action occurs when that predetermined position has been reached showing that the braking mechanism connected with said pedal is either broken or out of order, the leg 21 of the rocker arm then becomes engaged by the yoke 20 as shown in Fig. 2 to rotate the rocker arm on its shaft in a counter-clockwise direction which effects a rocking of the cam arm 33 on its pivot 34 due to the connection 36 between the rocker arm and said cam arm. This, as is manifest, effects a braking action of the brake band 30 on the brake drum 29 in the manner previously described, but the position of the emergency hand lever 25 remains unaffected as the flexible connection 35 merely slackens. It will be apparent that when pressure against the foot pedal 14 is released, the various parts assume their normal position.

In addition, in some cases it has been found desirable to employ a signal to give an indication that the foot pedal has reached a position which shows that the braking mechanism normally connected therewith is either out of order or broken. This signal or indicator may be in the form of a lamp 37 shown diagrammatically in Fig. 1 or a buzzer 38 shown diagrammatically in Fig. 2. The lamp or buzzer, as the case may be, is in circuit with a battery 39 or other source of current supply, the circuit being closed by a slidable switch 40 adapted to make connection with the circuit terminals 41. The slidable switch 40 is connected by a rod 42 with the yoke 20, the end of said rod 42 preferably being screwthreaded and screwed within the head of said yoke for purposes of adjustment.

Various modifications may be resorted to and be within the scope of the invention as set forth in the appended claims. As an example, for instance, adjustable yokes may be employed for making connection between the flexible connections 35 and 36 and the lower ends of hand lever 25 and leg 23 respectively to permit of adjustment of the operating length of said connections or cables 35 and 36 especially when the length of rod 42 is adjusted.

The invention claimed is:

1. In a vehicle, a service brake, a foot-actuated control means for actuating said service brake, an emergency brake, a cam operator associated therewith, two distinct tension means for exerting brake-applying action to the cam operator, a hand lever connected by one of said tension means to said cam operator for conveying the brake-applying exertion of the hand lever to said cam operator, pull means for the other of said tension means, said pull means being proximate to the service brake actuating means but unaffected by normal operation thereof in applying the service brake, and a lost-motion connection from said foot-actuated control means to said pull means wherein the lost motion is operative during normal operation of the foot-actuated control means and said connection becomes operative to operate said pull means after said foot-actuated control passes beyond normal position.

2. In a vehicle, a service brake, a pivotally mounted foot pedal having a depending shank for actuating said service brake, an emergency brake, a cam operator associated therewith, two distinct tension means for exerting brake-applying action to the cam operator, both said tension means being directly secured to the cam operator, a hand lever connected by one of said tension means to said cam operator for conveying the brake-applying exertion of the hand lever to said cam operator, pull means for and directly connected to the other of said tension means, said pull means being proximate to the foot pedal shank but unaffected by normal operation thereof, and a lost motion connection from said depending shank of the foot pedal to said pull means wherein the lost motion is operative during normal operation of the shank in applying the service brake and said connection becomes effective to operate said pull means after said shank passes beyond normal position.

3. In a vehicle, a service brake, a foot pedal and pivoted shank for actuating said service brake, an emergency brake, a cam operator associated therewith, two distinct tension means for exerting brake-applying action to the cam operator, both said tension means being directly secured to the cam operator, a hand lever connected by one of said tension means to said cam operator for conveying the brake-applying exertion of the hand lever to said cam operator, a rocker arm medially pivoted and connected at one end to the other of said tension means, said rocker arm having its other end proximate to the foot pedal and swingable toward and from the shank in the same plane of swinging of the lower end of said shank but unaffected by normal operation thereof, and a yoke providing a lost motion connection between said shank and rocker arm wherein the lost motion is operative during normal operation of the shank in applying the service brake and said yoke becomes effective to operate the rocker arm after said shank passes beyond normal position.

4. In a vehicle, a service brake, a foot-actuated control means for actuating said service brake, an emergency brake, an operating device therefor operatively coupled thereto, a hand lever connected to said operating device for actuating the same and a pivoted element connected to said foot-actuated control means and to said operating device and including a lost-motion connection in association therewith whereby said operating device is adapted for operation by the foot-actuated control means to actuate said emergency brake upon movement of said foot-actuated control means a predetermined distance independent of and without disturbance of the position of said hand lever.

5. In a vehicle, a service brake, a foot-actuated control means for actuating said service brake, an emergency brake comprising a brake band, spring means for normally holding said brake band in inoperative position, an operating device for actuating said brake band against the action of said spring means, a hand lever connected to said operating device for actuating the same, and brake band actuating means connected to said foot-actuated control means and to said operating device and including a lost-motion connection in association therewith whereby said operating device will actuate said emergency brake upon the movement of said foot-actuated control means a predetermined distance and independent of and without disturbance of the position of said hand lever.

6. In a brake mechanism for vehicles, a service brake, a foot-actuated control member for actuating said service brake, an emergency brake, an operating element for actuating the emergency brake, a hand lever for normally transmitting brake applying motion to said element, and mechanical connections between said foot-actuated control member and said hand lever and the operating element whereby said operating element may be actuated by the foot-actuated control member or by the hand lever independently of each other.

7. In a brake mechanism for vehicles, a service brake, a foot-actuated control member having a predetermined normal range of motion for actuating said service brake, an emergency brake, an operating element for actuating the emergency brake, a hand lever for normally transmitting brake applying motion to said element, and mechanical connections between said hand lever and operating element and said foot-actuated control member and operating element operative to permit normal actuation of the emergency brake by the hand lever independent of the foot-actuated control member and to permit actuation of the emergency brake on a movement of said control member beyond its predetermined service brake actuating range of movement independent of the hand lever.

8. In a brake actuating mechanism for vehicles, a service brake, a foot-actuated control member for actuating said service brake, an emergency brake, an operating element for actuating the emergency brake, a hand lever for transmitting brake applying motion to said element, and mechanical operating connections between the hand lever and operating element and between the foot-actuated control member and the operating element, including a pivoted member and a lost motion connection between the same and the foot-actuated control member, operative to permit normal actuation of the emergency brake by the hand lever independent of the foot-actuated control member and to permit actuation of the emergency brake on a movement of said control member beyond its predetermined service brake actuating range of movement independent of the hand lever.

AUGUST F. KRUEGER.